No. 609,975. Patented Aug. 30, 1898.
F. ROSS.
SADDLE AND GIRTH CONNECTION.
(Application filed Dec. 4, 1897.)
(No Model.)
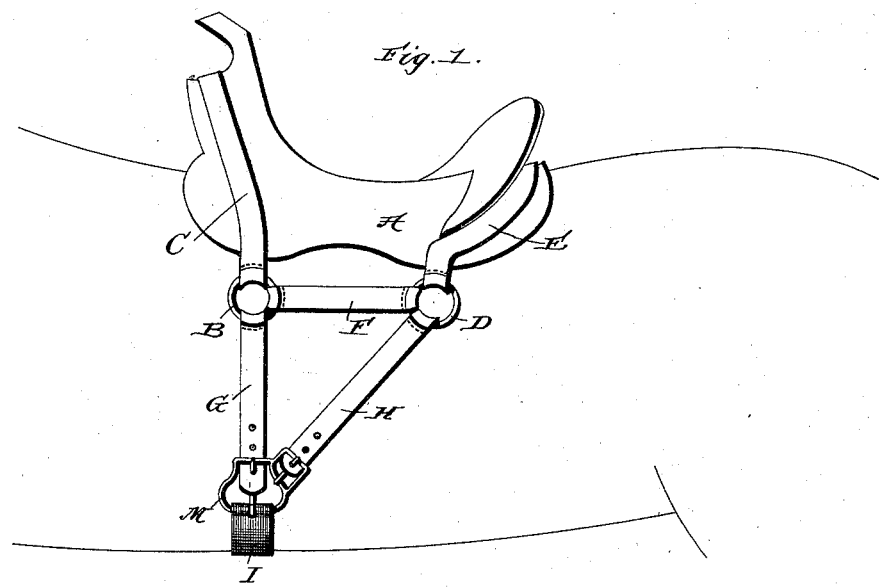
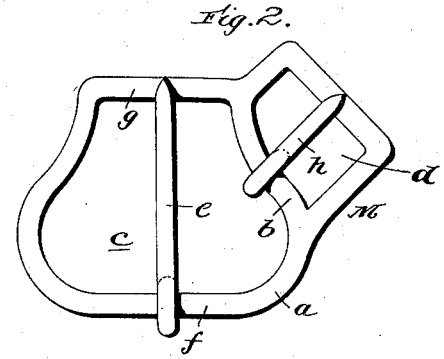

UNITED STATES PATENT OFFICE.

FREDERICK ROSS, OF CRAIG, COLORADO.

SADDLE AND GIRTH CONNECTION.

SPECIFICATION forming part of Letters Patent No. 609,975, dated August 30, 1898.

Application filed December 4, 1897. Serial No. 660,734. (No model.)

*To all whom it may concern:*

Be it known that I, FREDERICK ROSS, a citizen of the United States, residing at Craig, in the county of Routt and State of Colorado, have invented certain new and useful Improvements in Saddle-Buckles; and I do declare the following to be a full, clear, and exact description of the invention, such as will enable others skilled in the art to which it appertains to make and use the same.

My invention relates to saddle-girths, and has for one of its objects to provide a girth embodying buckles which are so constructed as to permit of the girth being quickly and easily adjusted as the size and shape of a horse may require.

Another object of the invention is to provide a saddle-girth which embodies but a single girth-strap or "cinch" and yet is adapted to securely hold both ends of the saddle down upon a horse's back, as is necessary when the rider is "roping" cattle or horses, and which is also adapted to prevent the single girth-strap or cinch from slipping forward against the horse's shoulders and producing sores on the legs.

With the foregoing in view the invention will be fully understood from the following description and claims when taken in conjunction with the annexed drawings, in which—

Figure 1 is a side elevation illustrating a saddle equipped with my improvements in position upon the body of a horse, and Fig. 2 is an enlarged elevation of one of the improved buckles which are used in the girth.

Referring by letter to the said drawings, A designates a saddle, which may be of the ordinary or any suitable construction.

B designates rings which are arranged at opposite sides of the forward portion of the saddle and are connected thereto, preferably by a strap C, of leather, which is arranged upon the saddletree in front of the pommel.

D designates rings which are arranged at opposite sides of the rear portion of the saddle and are connected to the same, preferably by a strap E, which is arranged upon the saddletree in rear of the cantle.

F designates straps which connect the rings B D at each side of the saddle.

G H designate straps connected to the rings B D, respectively, and provided with apertures or otherwise adapted to be adjusted.

I designates the girth-strap or cinch, and M designates my improved buckle for adjustably connecting the opposite ends of the girth-strap or cinch with the straps G H. Two of these buckles are employed, and, as better shown in Fig. 2, they respectively comprise a frame $a$, which is divided by a rigid bar $b$ into two loops $c$ $d$, aranged as shown with respect to each other, a tongue $e$, which is pivotally mounted upon the bar $f$ of the loop $c$ and is designed to bear on the outer bar $g$ thereof, and the tongue $h$, which is pivotally mounted on the divisional bar $b$ and is designed to bear on the outer bar $i$ of the loop $d$, as shown.

The bars $f$ of the buckles M are permanently connected to the opposite ends of the girth-strap I, while the loops $c$ $d$ are designed to receive the lower ends of the straps G H, respectively, which their tongues are adapted to engage, as shown in Fig. 1.

The buckles M afford a strong and durable connection between the straps G H and the ends of the girth-strap I and permit of the girth-strap being readily adjusted in the direction of the length of the saddle as the shape and size of the horse requires, it being simply necessary in order to effect such adjustment to let out one of the straps G H and take up the other, according to the position it is desired to have the girth-strap assume. In virtue of the construction of the girth it will be observed that irrespective of the position of the girth-strap both ends of the saddle will be securely held down upon the horse's back. This is an important advantage, especially when the rider is engaged in roping cattle with a lariat fastened to the saddle-pommel. It is also advantageous because it obviates the necessity of employing the highly-objectionable flank-strap.

It will further be observed that the construction shown and described effectually prevents the girth-strap from slipping forwardly against the horse's shoulder and producing sores on the legs.

I prefer to connect the straps G H with the ends of the girth-strap I through the medium of my improved buckles M because of the simplicity and strength of the said buckles and the facility with which they permit of adjustments being effected.

I do not desire, however, to be understood as confining myself to the use of the buckle, as any construction in which the straps are independently and adjustably connected to the girth-strap may be employed.

Having thus described my invention, what I claim is—

1. In a saddle-girth, the combination of a saddle, a girth-strap, straps G, H, arranged at one side of the saddle and connected at their upper ends with the saddle adjacent to the opposite ends thereof and having apertures at intervals in their length, and the buckle permanently connected at one end of the girth-strap and adjustably connecting the same with the straps G, H; the said buckle comprising the frame formed in one piece and having the rigid divisional bar dividing it into two loops, a tongue pivotally mounted on the frame-bar connected to the girth-strap and adapted to bear on the opposite bar of one loop, and the tongue pivotally mounted on the divisional bar and adapted to bear on the opposite bar of the other loop, substantially as specified.

2. In a saddle-girth, the combination of a saddle, rings arranged on opposite sides of the saddle at points adjacent to the opposite ends thereof, and connected to the ends of straps resting in front of the pommel and in rear of the cantle, respectively, straps F, arranged on opposite sides of the saddle and connecting the rings, straps G, H, connected to and depending from the rings, and having apertures at intervals in their length, a girth-strap and the buckles permanently connected to the ends of the girth-strap and adjustably connecting the same with the straps G, H; the said buckles respectively comprising the frame formed in one piece and having the divisional bar dividing it into two loops, a tongue pivotally mounted on the frame-bar connected to the girth-strap and adapted to bear on the opposite bar of one loop, and the tongue pivotally mounted on the divisional bar and adapted to bear on the opposite bar of the other loop, substantially as specified.

In testimony whereof I affix my signature in presence of two witnesses.

FREDERICK ROSS.

Witnesses:
C. A. SEYMOUR,
L. A. McGOWEN.